United States Patent  (10) Patent No.: US 12,136,745 B1
Ma  (45) Date of Patent: Nov. 5, 2024

(54) CONNECTING STRUCTURE, BATTERY MODULE, ENERGY STORAGE APPARATUS, AND ELECTRONIC DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventor: Yaqiang Ma, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

(*) Notice: Subject to any disclaimer, the term of this patent is extended or adjusted under 35 U.S.C. 154(b) by 0 days.

(21) Appl. No.: 18/588,931

(22) Filed: Feb. 27, 2024

(30) Foreign Application Priority Data

Jun. 15, 2023 (CN) .......................... 202310708992.2

(51) Int. Cl.
  *H01M 50/503* (2021.01)
  *H01M 50/209* (2021.01)
  *H01M 50/258* (2021.01)
  *H01M 50/507* (2021.01)
  *H01M 50/516* (2021.01)

(52) U.S. Cl.
  CPC ....... *H01M 50/503* (2021.01); *H01M 50/209* (2021.01); *H01M 50/258* (2021.01); *H01M 50/507* (2021.01); *H01M 50/516* (2021.01)

(58) Field of Classification Search
  CPC .......................... H01M 50/502; H01M 50/503
  See application file for complete search history.

(56) References Cited

U.S. PATENT DOCUMENTS

2009/0123820 A1 5/2009 Han

FOREIGN PATENT DOCUMENTS

| CN | 208173684 U | 11/2018 |
| CN | 109411685 A | 3/2019 |
| CN | 210272949 U | 4/2020 |

(Continued)

OTHER PUBLICATIONS

CNIPA, First Office Action for corresponding Chinese Patent Application No. 202310708992.2, Jul. 20, 2023, 16 pages.

(Continued)

*Primary Examiner* — Maria Laios
(74) *Attorney, Agent, or Firm* — IP Spring

(57) ABSTRACT

A connecting structure, a battery module, an energy storage apparatus, and an electronic device are provided. The connecting structure includes a connecting assembly and a conducting member. The connecting assembly includes a first connecting member and a second connecting member. The first connecting member includes a first bending portion, a first connecting portion, and a second connecting portion. The first connecting portion, the first bending portion, and the second connecting portion surround a space to define an inserting groove. The second connecting member is mounted in the inserting groove and resiliently abuts against the first connecting portion and the second connecting portion. The second connecting member includes a bridging portion, a first plate, and a second plate. Each of the first plate and the second plate is provided with a resilient portion, the resilient portion has a first sub-section.

20 Claims, 7 Drawing Sheets

(56) References Cited

FOREIGN PATENT DOCUMENTS

| | | |
|---|---|---|
| CN | 113258220 A | 8/2021 |
| CN | 215451691 U | 1/2022 |
| CN | 217239681 U | 8/2022 |
| CN | 217768674 U | 11/2022 |
| CN | 116014367 A | 4/2023 |
| CN | 116169397 A | 5/2023 |
| CN | 116435717 A | 7/2023 |
| JP | 2011090812 A | 5/2011 |
| WO | 2014123023 A1 | 8/2014 |

OTHER PUBLICATIONS

CNIPA, Second Office Action for corresponding Chinese Patent Application No. 202310708992.2, Aug. 1, 2023, 15 pages.
CNIPA, Notice of Allowance for corresponding Chinese Patent Application No. 202310708992.2, Aug. 14, 2023, 9 pages.
CNIPA, International Search Report for corresponding International Patent Application No. PCT/CN2023/108924, Feb. 19, 2024, 6 pages.

US 12,136,745 B1

CONNECTING STRUCTURE, BATTERY MODULE, ENERGY STORAGE APPARATUS, AND ELECTRONIC DEVICE

CROSS-REFERENCE TO RELATED APPLICATIONS

This application claims priority under 35 U.S.C. § 119(a) to and the benefit of Chinese Patent Application No. 202310708992.2, filed Jun. 15, 2023, the entire disclosure of which is incorporated herein by reference.

TECHNICAL FIELD

The disclosure relates to the technology field of energy storage apparatuses, and in particular, to a connecting structure, a battery module, an energy storage apparatus, and an electronic device.

BACKGROUND

Generally, multiple battery modules are provided in a battery system to increase an energy density of the battery system, and electrical connections among the battery modules are implemented via conducting members. The conducting member is generally fixed to the battery module via a bolt. During an operation of the battery system, the bolt is easy to loosen to cause a gradually increased connection impedance that may cause increased heat-generation at electrical connection between the conducting member and the battery module, thereby causing overheating and fire at the electrical connection, and further causing fire and explosion of the battery system.

SUMMARY

In a first aspect, a connecting structure is provided in implementations of the disclosure. The connecting structure includes a connecting assembly and a conducting member. The connecting assembly includes a first connecting member and a second connecting member. The first connecting member includes a first bending portion, a first connecting portion, and a second connecting portion opposite the first connecting portion. One end of the first connecting portion is connected to one end of the second connecting portion via the first bending portion, and the first connecting portion, the first bending portion, and the second connecting portion surround a space to define an inserting groove. The second connecting member is mounted in the inserting groove and resiliently abuts against the first connecting portion and the second connecting portion. The second connecting member includes a bridging portion, a first plate, and a second plate opposite the first plate, two ends of the bridging portion are respectively connected to the first plate and the second plate, and the bridging portion, the first plate, and the second plate surround a space to define an accommodating cavity. Each of the first plate and the second plate is provided with a resilient portion, the resilient portion has a first sub-section protruding towards the accommodating cavity, and the first sub-section of the first plate and the first sub-section of the second plate cooperatively define a first gap extending in a thickness direction of the second connecting member. The conducting member is mounted in the accommodating cavity. One end of the conducting member in a height direction of the conducting member abuts against the bridging portion, a first width D1 of the first gap is less than a first thickness H1 of the conducting member, and two opposite sides of the conducting member in a thickness direction of the conducting member resiliently abut against the first sub-section of the first plate and the first sub-section of the second plate, respectively.

In a second aspect, a battery module is provided in the disclosure. The battery module includes at least two battery cells and the connecting structure provided in any one of the implementations of the disclosure. Each first connecting portion is electrically connected to one of the at least two battery cells, and the conducting member is mounted in the accommodating cavities of two adjacent second connecting members and is electrically connected to the two adjacent second connecting members.

In a third aspect, an energy storage apparatus is provided. The energy storage apparatus includes the battery module provided in the second aspect.

In a fourth aspect, an electronic device is provided. The electronic device includes the energy storage apparatus provided in the third aspect. The energy storage apparatus is configured to supply the electronic device.

BRIEF DESCRIPTION OF THE DRAWINGS

To describe technical solutions in implementations of the disclosure more clearly, the following briefly introduces the accompanying drawings required for describing the implementations.

Figure 1:
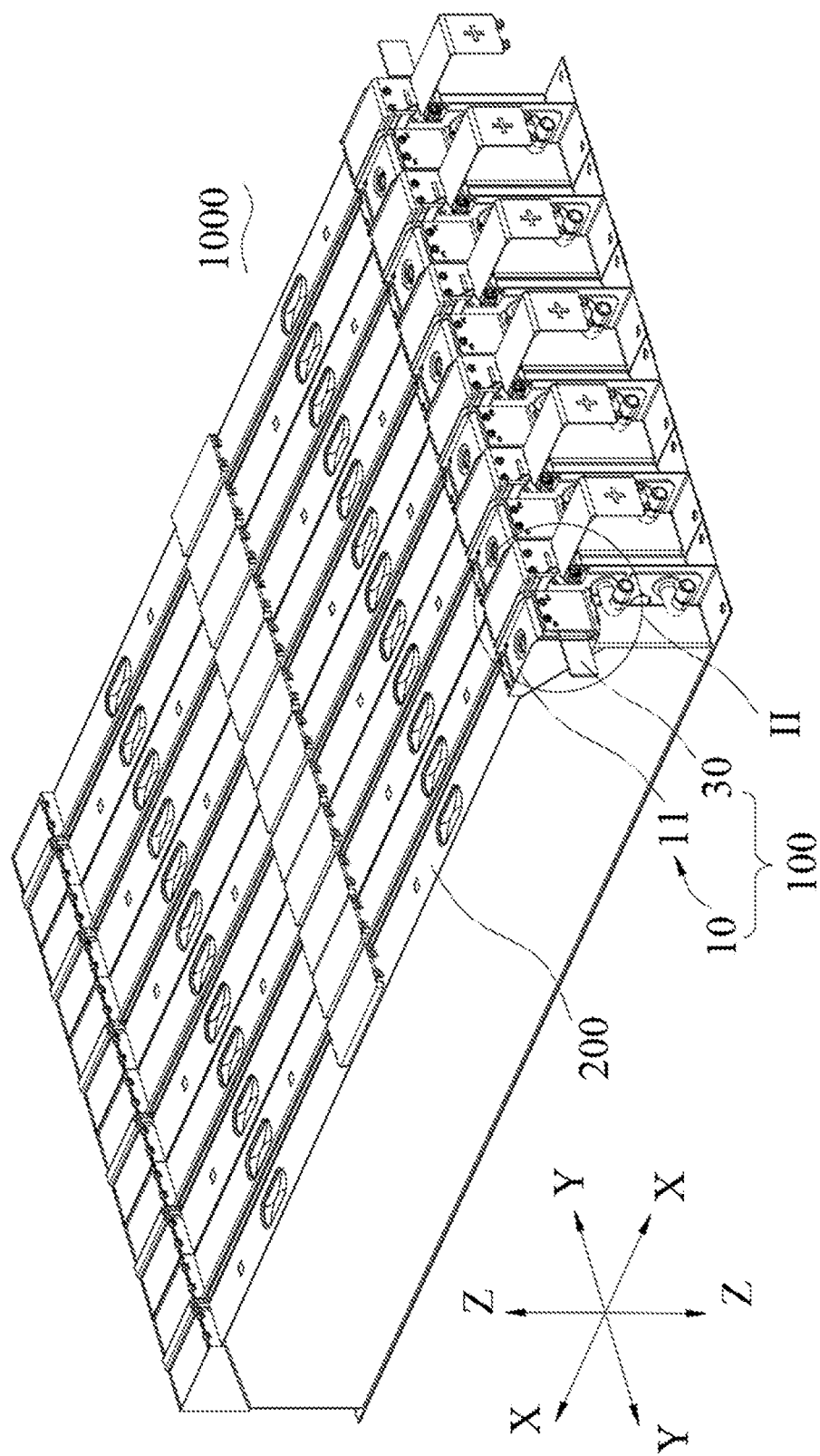
FIG. 1 is a schematic perspective structural view of a battery module provided in an implementation of the disclosure.

REFERENCE SIGNS first width D1, second width D2, third width D3, fourth width D4, first thickness H1, second thickness H2, third thickness H3, first angle α1, second angle α2, third angle α3, fourth angle α4; connecting structure 100, connecting assembly 10, first connecting member 11, first bending portion 111, first connecting portion 112, first positioning hole 1121, first fixing hole 1122, second positioning hole 1123, second connecting portion 113, second fixing hole 1131, third positioning hole 1132, fourth positioning hole 1133, inserting groove 114, welding portion 115, second bending portion 116, third bending portion 117, second connecting member 13, first plate 131, first end 1311, first positioning portion 1312, second end 1313, second positioning portion 1314, second plate 132, third end 1321, third positioning portion 1322, fourth end 1323, fourth positioning portion 1324, accommodating cavity 133, opening 1331, first gap 1332, second gap 1333, third gap 1334, resilient portion 134, resilient section 1341, first sub-section 1342, second sub-section 1343, guiding section 1344, bridging portion 135, conducting member 30, fastener 50, base 70, cover plate 90, battery cell 200; and battery module 1000.

DETAILED DESCRIPTION

The following clearly and completely describes the technical solutions in the implementations of the disclosure with reference to the accompanying drawings in the implementations of the disclosure. Apparently, the described implementations are merely part rather than all of the implementations of the disclosure. All other implementations obtained by those of ordinary skill in the art based on the implementations of the disclosure without creative efforts shall fall within the protection scope of the disclosure.

The following illustrations of various implementations are provided with reference to the accompanying drawings to illustrate specific implementations that can be implemented in the disclosure. Directional terms such as "up", "down", "front", "back", "left", "right", "inside", "outside", "side", and the like referred to herein which are only for directions with reference to the accompanying drawings. Therefore, the directional terms used herein are intended to better and more clearly illustrate and understand the disclosure, rather than explicitly or implicitly indicate that devices or elements referred to herein must have a certain direction or be configured or operated in a certain direction and therefore cannot be understood as limitation on the disclosure.

In addition, ordinal numbers of components in the disclosure, such as "first", "second", and the like, are only used to distinguish the described objects and do not imply any order or technical meaning. Terms "connected" and "coupled" in the disclosure, unless otherwise specified, both include direct connection and indirect connection.

Figure 2:
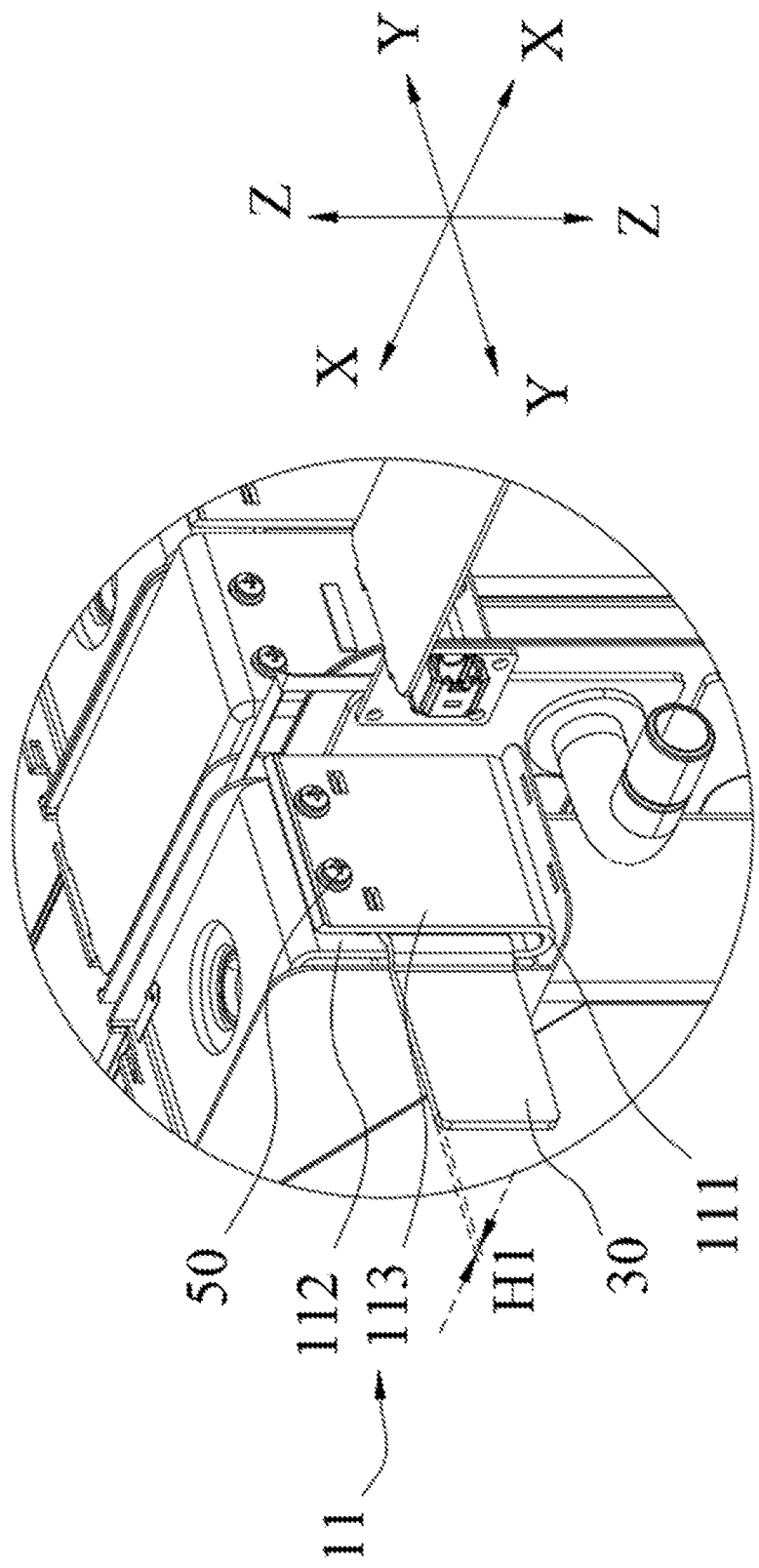
FIG. 2 is an enlarged view of the battery module at circle II in FIG. 1.

Referring to FIG. 1 and FIG. 2, a battery module 1000 is provided in the disclosure. The battery module 1000 includes at least two battery cells 200 and a connecting structure 100 provided in the implementations of the disclosure.

Figure 3:
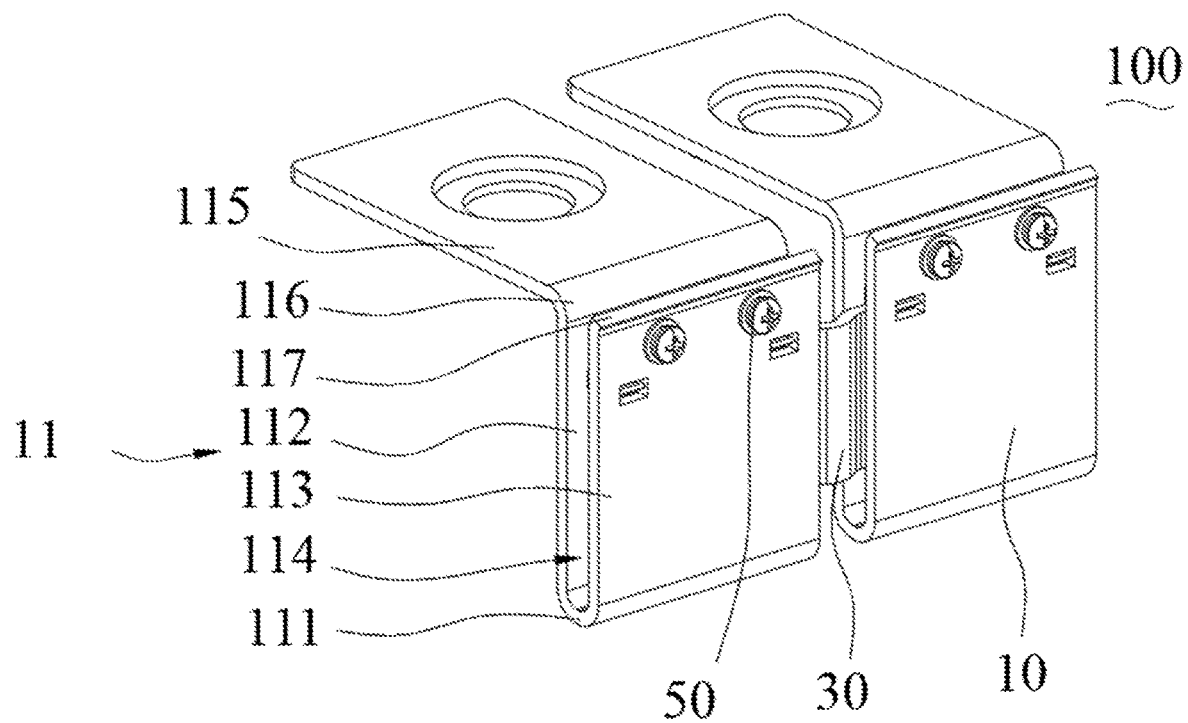
FIG. 3 is a schematic perspective structural view of a connecting structure provided in an implementation of the disclosure.
Figure 4:
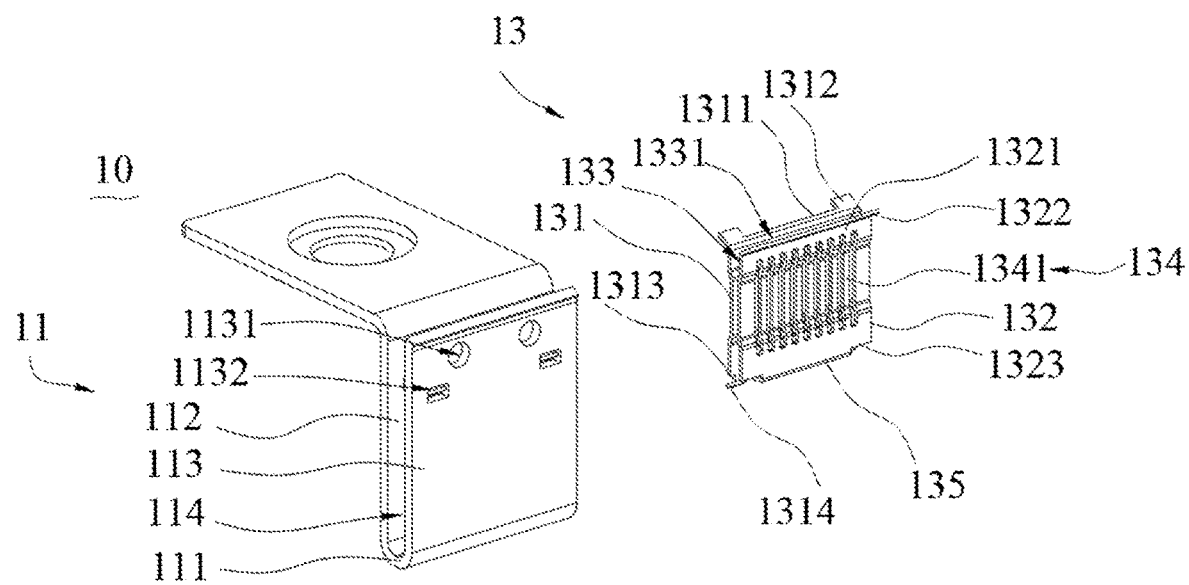
FIG. 4 is an exploded view of a first connecting member and a second connecting member of a connecting structure provided in an implementation of the disclosure.

Referring to FIG. 3 and FIG. 4, the connecting structure 100 provided in the implementations of the disclosure includes a connecting assembly 10 and a conducting member 30. The connecting assembly 10 includes a first connecting member 11 and a second connecting member 13. The first connecting member 11 includes a first bending portion 111, a first connecting portion 112, and a second connecting portion 113 opposite the first connecting portion 112. One end of the first connecting portion 112 is connected to one end of the second connecting portion 113 via the first bending portion 111. The first connecting portion 112, the first bending portion 111, and the second connecting portion 113 surround a space to define an inserting groove 114. The second connecting member 13 is mounted in the inserting groove 114 and resiliently abuts against the first connecting portion 112 and the second connecting portion 113. The second connecting member 13 includes a bridging portion 135, a first plate 131, and a second plate 132 opposite the first plate 131. Two ends of the bridging portion 135 are respectively connected to the first plate 131 and the second plate 132. The bridging portion 135, the first plate 131, and the second plate 132 surround a space to define an accommodating cavity 133. Each of the first plate 131 and the second plate 132 is provided with a resilient portion 134. The resilient portion 134 has a first sub-section 1342 protruding towards the accommodating cavity 133, and the first sub-section 1342 of the first plate 131 and the first sub-section 1342 of the second plate 132 cooperatively define a first gap 1332 extending in a thickness direction of the second connecting member 13. The conducting member 30 is mounted in the accommodating cavity 133. One end of the conducting member 30 in a height direction of the conducting member 30 abuts against the bridging portion 135. A first width D1 of the first gap 1332 is less than a first thickness H1 of the conducting member 30. Two opposite sides of the conducting member 30 in a thickness direction of the conducting member 30 resiliently abut against the first sub-section 1342 of the first plate 131 and the first sub-section 1342 of the second plate 132, respectively.

The thickness direction in the disclosure is an X direction as illustrated in FIG. 1 and FIG. 2, the length direction in the disclosure is a Y direction as illustrated in FIG. 1 and FIG. 2, and the height direction in the disclosure is a Z direction as illustrated in FIG. 1 and FIG. 2.

It can be understood that, after the second connecting member 13 is mounted in the inserting groove 114, the second connecting member 13 is resiliently compressed, and the first plate 131 and the second plate 132 are pressed against the first connecting portion 112 and the second connecting portion 113 due to a resilient force, and thus the second connecting member 13 can be firmly mounted in the inserting groove 114 and abut against the first connecting portion 112 and the second connecting portion 113, thereby achieving electrical connection between the second connecting member 13 and the first connecting member 11.

Exemplarily, both the first plate 131 and the second plate 132 are received in the inserting groove 114.

Specifically, each first connecting portion 112 is electrically connected to one battery cell 200, part of the conducting member 30 is mounted in the accommodating cavities 133 of two adjacent second connecting portions 13, and the conducting member 30 is electrically connected to the two adjacent second connecting members 13.

It can be understood that, each battery cell 200 is mounted with one connecting assembly 10, and the conducting member 30 is connected to the second connecting members 13 of two adjacent connecting assemblies 10, thereby achieving electrical connection among the battery cells 200.

In the connecting structure 100 and the battery module 1000 of the disclosure, the second connecting member 13 is provided with a resilient portion 134. After the second connecting member 13 is inserted into the inserting groove 114 of the first connecting member 11, the conducting member 30 can be inserted into the accommodating cavity 133 along the resilient portion 134 of the first plate 131 and the resilient portion 134 of the second plate 132 to resiliently abut against the first sub-section 1342 of the first plate 131 and the first sub-section 1342 of the second plate 132. That is, the conducting member 30 is received in the first gap 1332, thereby achieving electrically connection between the conducting member 30 and the second connecting member 13. Alternatively, the conducting member 30 is first inserted into the accommodating cavity 133 along the resilient portion 134 of the first plate 131 and the resilient portion 134 of the second plate 132 to resiliently abut against the first sub-section 1342 of the first plate 131 and the first sub-section 1342 of the second plate 132, and then the conducting member 30 and the second connecting member 13 are mounted together into the inserting groove 114 of the first connecting member 11. Since the first width D1 of the first gap 1332 is less than the first thickness H1 of the conducting member 30, the conducting member 30 will apply a pushing force to the first sub-sections 1342 at both sides of the conducting member 30 when the conducting member 30 is inserted into the first gap 1332. Since the first sub-section 1342 is part of the resilient portion 134, the first sub-section 1342 will have a restoring force to press the conducing member 30 when being subject to the pushing force applied by the conducting member 30, so that a surface of the first sub-section 1342 of the first plate 131 facing the first gap 1332 and a surface of the first sub-section 1342 of the second plate 132 facing the first gap 1332 can clamp the conducting member 30. In addition, the bridging portion 135 between the first plate 131 and the second plate 132 supports one end of the conducting member 30, thereby preventing the conducting member 30 from falling off from the first gap 1332, and ensuring stability of electrical connection between the conducting member 30 and the second connecting member 13. In addition, the second connecting member 13 abuts against the first connecting portion 112 and the second connecting portion 113 to achieve electrical connection between the second connecting member 13 and the first connecting member 11, thereby achieving electrical connection among the conducting member 30, the second connecting member 13, and the first connecting member 11. The connecting structure 100 of the disclosure does not require a bolt connection, thereby avoiding overheating and fire caused by a bolt torque attenuation caused by the bolt connection, and ensuring the safety of the battery module 1000. At the same time, quick insertion and connection of the second connecting member 13 facilitates improving automation efficiency of the production line and improving production efficiency.

Referring to FIG. 4, the first bending portion 111 is located at one end of the first connecting member 11, and the first bending portion 111 is bent and connected to the first connecting portion 112 and the second connecting portion 113. The first connecting portion 112, the first bending portion 111, and the second connecting portion 113 are of a U-shaped structure as a whole and cooperatively define the inserting groove 114. As illustrated in FIG. 4, the inserting groove 114 defines an opening at one side of the inserting groove 114 in a height direction of the inserting groove 114, and thus the second connecting member 13 can be mounted in the inserting groove 114 through the opening. The conducting member 30 may also be mounted into the accommodating cavity 133 through the opening. The inserting groove 11 also defines an opening at each of two opposite sides of the inserting groove 114 in a length direction of the inserting groove 114, so that the conducting member 30 can be connected to the second connecting members 13 of two adjacent first connecting members 11. The first bending portion 111 facilitates bending of the first connecting portion 112 in a direction away from the second connecting portion 113 and bending of the second connecting portion 113 in a direction away from the first connecting portion 112.

Figure 5:
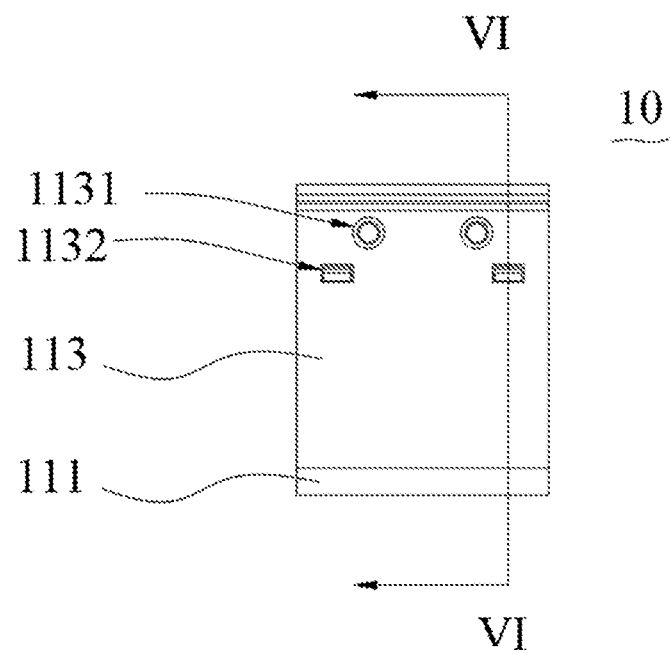
FIG. 5 is a schematic perspective structural view of a connecting structure provided in an implementation of the disclosure, viewed from a direction.
Figure 6:
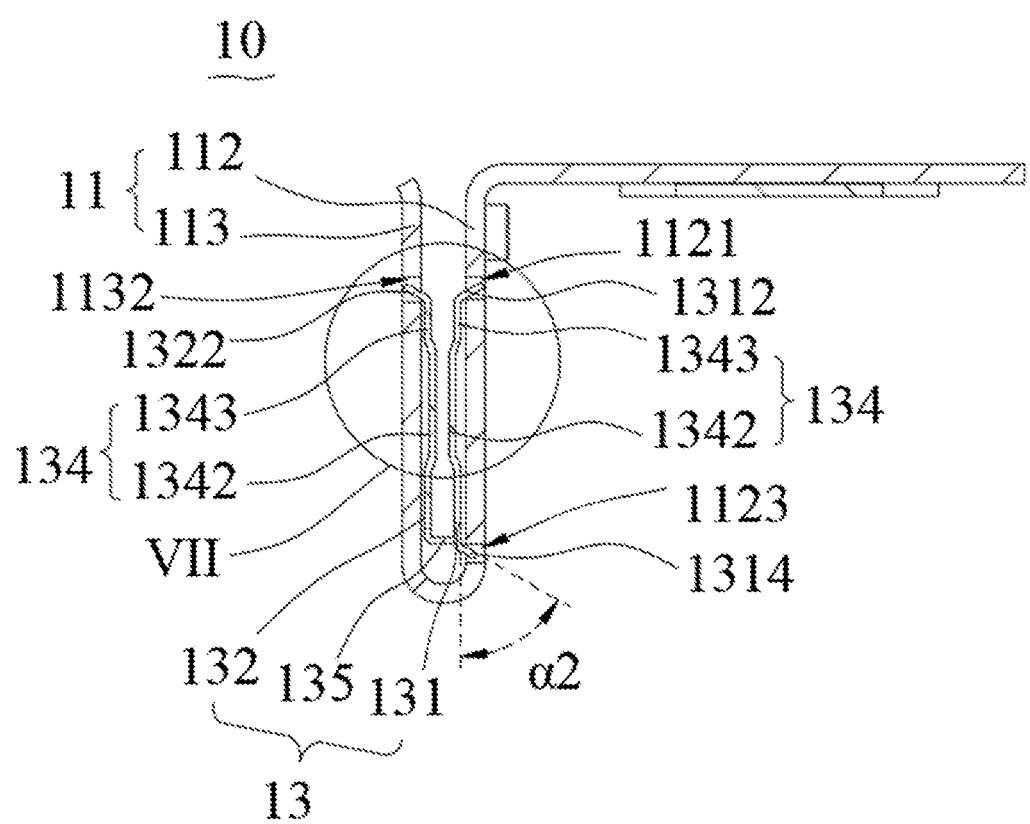
FIG. 6 is a schematic cross-sectional view of the connecting structure in FIG. 5, taken along line VI-VI.

Referring to FIGS. 4-6, the resilient portion 134 of the first plate 131 has the same structure as the resilient portion 134 of the second plate 132. The resilient portion 134 of the first plate 131 and the resilient portion 134 of the second plate 132 are arranged symmetrically with respect to a central axis of the accommodating cavity 133 in a height direction of the accommodating cavity 133. Thus, after the conducting member 30 is mounted in the accommodating cavity 133, two surfaces of the conducting member 30 oppositely arranged in the thickness direction of the conducting member 30 can both be attached to the resilient portions 134, thereby ensuring connection stability between the conducting member 30 and the resilient portions 134, and further ensuring the stability of electrical connection between the conducting member 30 and the second connecting member 13.

As illustrated in FIG. 4, the resilient portion 134 is provided with multiple resilient sections 1341. The multiple resilient sections 1341 are spaced apart from one another and have the same structure. Each resilient section 1341 includes a first sub-section 1342 protruding towards the accommodating cavity 133. The first gap 1332 is defined between the first sub-section 1342 of the first plate 131 and the first sub-section 1342 of the second plate 132.

It can be understood that the first gap 1332 serves as part of the accommodating cavity 133.

For example, when the conducting member 30 is mounted in the accommodating cavity 133, the first width D1 of the first gap 1332 is equal to the first thickness H1 of the conducting member 30, where the conducting member 30 is uniform in thickness at various positions. Alternatively, when the conducting member 30 is mounted in the accommodating cavity 133, the first width D1 of the first gap 1332 is less than the first thickness H1 of part of the conducting member 30 in the first gap 1332. Before the conducting member 30 is mounted in the accommodating cavity 133, the first width D1 of the first gap 1332 is less than the first thickness H1 of the conducting member 30. Thus, when the conducting member 30 is mounted in the accommodating cavity 133 and resiliently abuts against the resilient portion 134, the resilient portion 134 deforms resiliently under a force applied by the conducting member 30. The resilient portion 134 has a tendency to resume resilient deformation to apply a reverse force to the conducting member 30. As a result, the resilient portions 134 at both sides can clamp the conducting member 30, thereby preventing the conducting member 30 from sliding off from the resilient portion 134, and ensuring the stability of electrical connection between the conducting member 30 and the second connecting member 13.

Optionally, the resilient portion 134 further has a second sub-section 1343 that is recessed relative to the first sub-section 1342 in a direction in which the second sub-section faces away from the accommodating cavity 133. The accommodating cavity 133 has an opening 1331. The second sub-section 1343 is located between the first sub-section 1342 and the opening 1331 in a height direction of the second connecting member 13.

The second sub-section 1343 recesses from the first sub-section 1342 in the direction away from the accommodating cavity 133 to form a guiding section 1344. The guiding section 1344 is located between the first sub-section 1342 and the second sub-section 1343. For example, a connecting portion between the first sub-section 1342 and the second sub-section 1343 is an arc section, and the arc section serves as the guiding section 1344. The guiding section 1344 of the first plate 131 and the guiding section 1344 of the second plate 132 cooperatively form a guiding portion. When the conducting member 30 is mounted through the opening 1331 onto the guiding portion of the second sub-section 1343 of the first plate 131 and the guiding portion of the second sub-section 1343 of the second plate 132, the conducting member 30 will undergo a secondary guidance of the guiding portions, so that the conducting member 30 can be inserted into the first gap 1332 and resiliently abut against the first sub-section 1342 of the first plate 131 and the first sub-section 1342 of the second plate 132.

For example, in a case where the second sub-section 1343 is disposed at one side of the first sub-section 1342 in a height direction of the first sub-section 1342, the second sub-section 1343 is closer to the opening 1331 than the first sub-section 1342. During mounting of the conducting member 30, the conducting member 30 is inserted into the accommodating cavity 133 through the opening 1331, the second sub-section 1343, and the first sub-section 1342 in sequence, and eventually abuts against the first sub-section 1342.

For another example, the first sub-section 1342 is provided with the second sub-section 1343 at each of two sides of the first sub-section 1342 in the height direction of the first sub-section 1342. That is, at the first plate 131 or the second plate 132, the first sub-section 1342 is located between two second sub-sections 1343, and one of the second sub-sections 1343 is closer to the opening 1331 than the first sub-section 1342. During mounting of the conducting member 30, the conducting member 30 is inserted into the accommodating cavity 133 through the opening 1331, one of the second sub-sections 1343, and the first sub-section 1342 in sequence, and eventually abuts against the first sub-section 1342.

Figure 7:
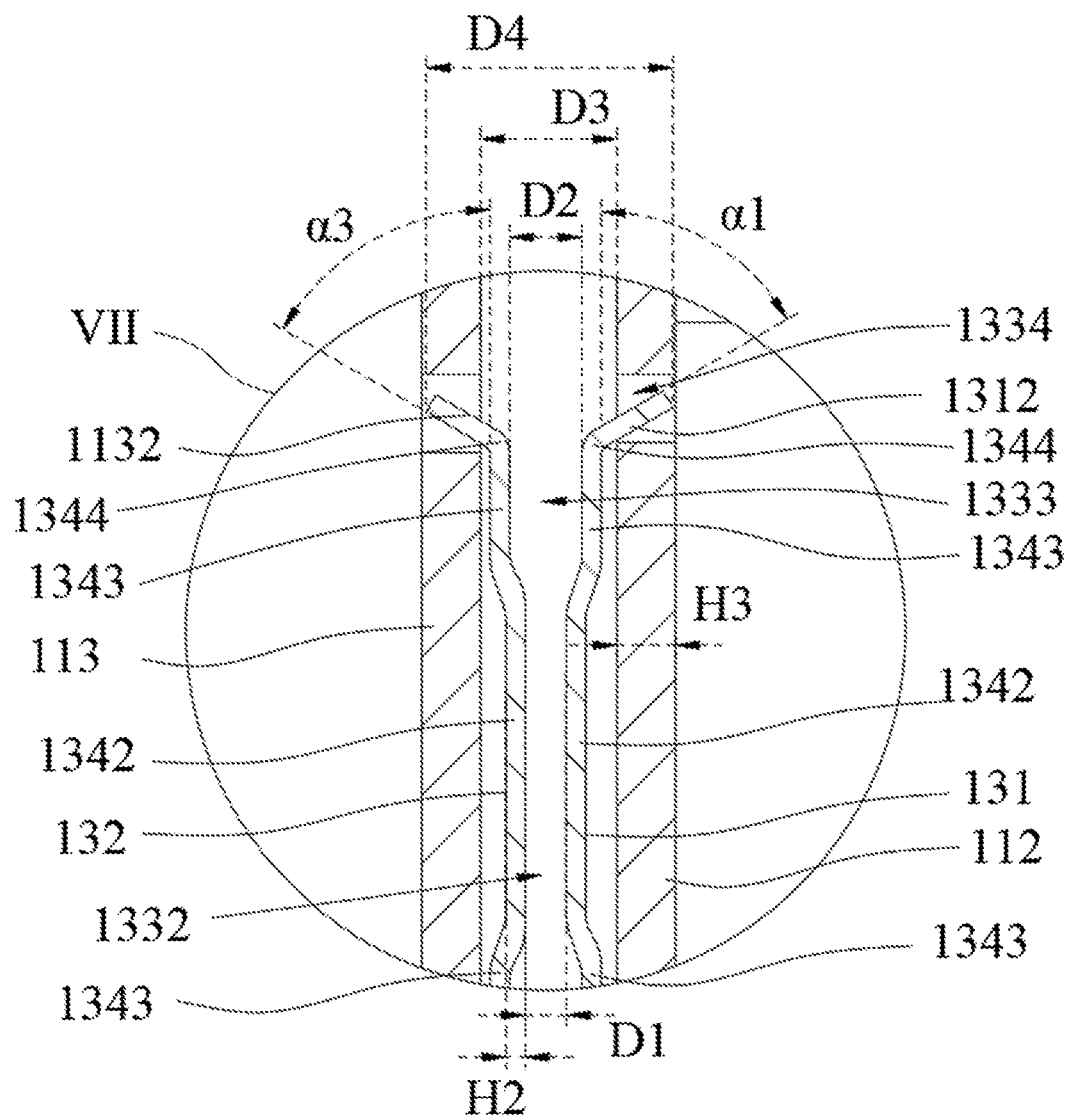
FIG. 7 is an enlarged view of the connecting structure at circle VII in FIG. 6.

Referring to FIG. 7, the second sub-section 1343 of the first plate 131 and the second sub-section 1343 of the second plate 132 cooperatively define a second gap 1333 in the thickness direction of the second connecting member 13, a second width D2 of the second gap satisfies $1.3*D1 \leq D2 \leq 1.5*D1$, and the second width D2 of the second gap 1333 is greater than the first width D1 of the first gap 1332.

In the thickness direction of the second connecting member 13, the second width D2 of the second gap 1333 is greater than the first width D1 of the first gap 1332, and the first width D1 of the first gap 1332 is less than the first thickness H1 of the conducting member 30. In the height direction of the second connecting member 13, the second sub-section 1343 is located between the first sub-section 1342 and the opening 1331. During insertion of the conducting member 30 into the accommodating cavity 133 through the opening 1331, the conducting member 30 does not contact the second sub-section 1343 close to the opening 1331 when passing through the second gap 1333, thereby preventing the second sub-section 1343 of the first plate 131 and the second sub-section 1343 of the second plate 132 from scratching the conducting member 30. If the second width D2 of the second gap 1333 is greater than 1.5*D1, and the second connecting member 13 is inserted into the inserting groove 114 of the first connecting member 11, the second width D2 of the second gap 1333 is excessively large, and the width of the inserting groove 114 also becomes larger accordingly, resulting in that the first connecting member 11 as a whole occupies an excessively large space in the battery module 1000 and an energy density of the battery module 1000 is reduced. The conducting member 30 needs to be mounted in the first gap 1332 through the second gap 1333, and if the second width D2 of the second gap 1333 is less than 1.3*D1, the conducting member 30 is easily scratched by the second sub-section 1343, thus requirements for mounting accuracy of the conducting member 30 are relatively high, resulting in a low assembling efficiency. In the disclosure, in the thickness direction of the second connecting member 13, the second width D2 of the second gap 1333 also satisfies $1.3*D1 \leq D2 \leq 1.5*D1$, which can prevent the second width D2 of the second gap 1333 from being excessively large, thereby preventing the first connecting member 11 from being excessively thick, effectively reducing the space occupied by the first connecting member 11 in the battery module 1000, and improving the energy density of the battery module 1000. At the same time, the second width D2 of the second gap 1333 can be prevented from being excessively small, and during insertion of the conducting member 30 into the accommodating cavity 133, the second sub-section 1343 is not easily scratched, thus requirements for the mounting accuracy of the conducting member 30 are relatively low, thereby improving the assembly efficiency, facilitating improvement of automation efficiency of the production line, and accelerating a production rhythm.

Referring to FIG. 7, in an example, a second thickness H2 of the first plate 131 is equal to a second thickness H2 of the second plate 132, and a third width D3 of the inserting groove 114 satisfies $D2+2.3*H2 \leq D3 \leq D2+2.5*H2$ in a thickness direction of the first connecting member 11.

If the third width D3 of the inserting groove 114 is less than $D2+2.3*H2$, the third width D3 of the inserting groove 114 is excessively small, and a mounting difficulty of the second connecting member 13 is large. If the third width D3 of the inserting groove 114 is greater than $D2+2.5*H2$, the third width D3 of the inserting groove 114 is excessively large, so that when the second connecting member 13 is mounted in the inserting groove 114, a clamping force applied by the first connecting portion 112 and the second connecting portion 113 to the second connecting member 13 will be relatively small, resulting in a poor connection stability between the second connecting member 13 and the first connecting member 11. In order to ensure a sufficient clamping force applied by the first connecting portion 112 and the second connecting portion 113 to the second connecting member 13, a width of the second connecting member 13 would have to be increased, causing an increased space occupied by the connecting structure 100. In the disclosure, in the thickness direction of the first connecting member 11, the third width D3 of the inserting groove 114 satisfies $D2+2.3*H2 \leq D3 \leq D2+2.5*H2$, so that when the second connecting member 13 is snapped into the inserting groove 114, it can ensure that the first connecting portion 112 and the second connecting portion 113 can stably clamp the second connecting member 13, thereby improving the connection stability between the second connecting member 13 and the first connecting member 11, and effectively reducing the space occupied by the connecting structure 100.

Figure 8:
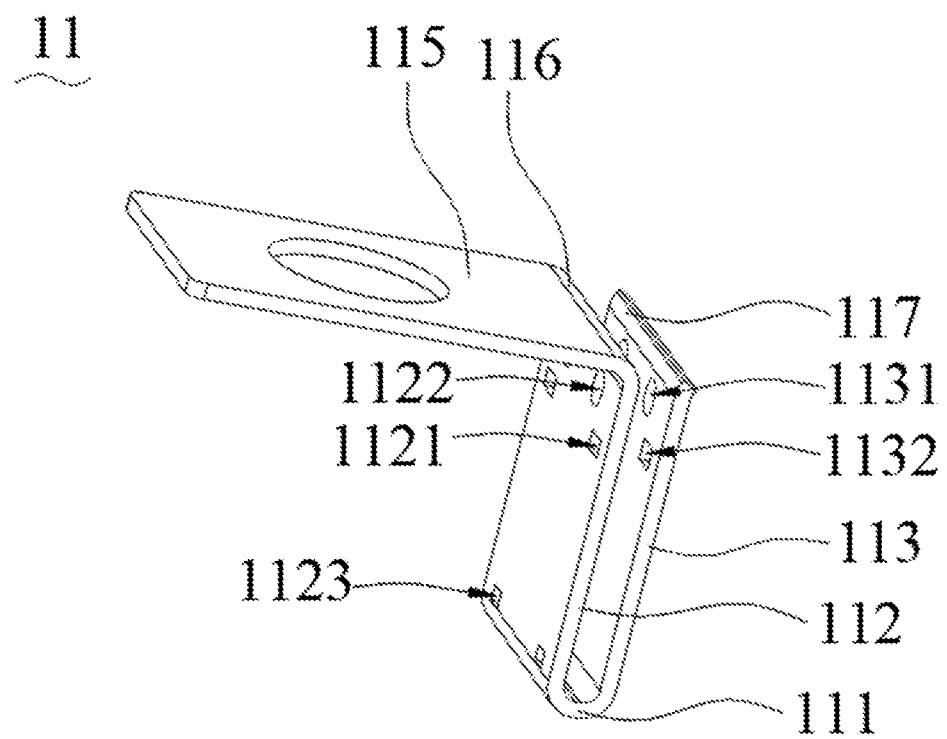
FIG. 8 is a schematic perspective structural view of a connecting structure provided in an implementation of the disclosure, viewed from another direction.

Referring to FIG. 4 and FIG. 8, in an example, the first connecting portion 112 defines a first positioning hole 1121. The first plate 131 includes a first end 1311. The first end 1311 has a first positioning portion 1312. The first positioning portion 1312 is bent relative to the first plate 131 in a direction in which the first positioning portion 1312 faces away from the second plate 132. The first positioning portion 1312 is inserted into the first positioning hole 1121.

The first positioning hole 1121 is a through hole. The first positioning hole 1121 may be implemented as one first positioning hole 1121, or alternatively, two or more first positioning holes 1121. The number of the first positioning portions 1312 is the same as that of the first positioning holes 1121. In the disclosure, the first positioning hole 1121 is implemented as two first positioning holes 1121, and the two first positioning holes 1121 are defined at the first connecting portion 112 and spaced apart from each other. The two first positioning portions 1312 are defined at the first end 1311 and located at two opposite sides of the first end 1311. With the two first positioning holes 1121 and the two first positioning portions 1312, it can ensure that the second connecting member 13 does not tilt after the conducting member 30 is mounted to the second connecting member 13, and thus connection stability between the conducting member 30 and the second connecting member 13 can be ensured.

When there are multiple first positioning holes 1121, the multiple first positioning holes 1121 are located at the same height of the first connecting portion 112, and accordingly, the multiple first positioning portions 1312 are located at the same height of the first plate 131.

Referring to FIG. 7, the first positioning portion 1312 is bent relative to the first plate 131 in a direction in which the first positioning portion 1312 faces away from the second plate 132. When the second connecting member 13 is mounted in the inserting groove 114, the first positioning portion 1312 faces the first connecting portion 112 with respect to the first plate 131. The first positioning portion 1312 can be inserted into the first positioning hole 1121 and abut against a peripheral wall of the first positioning hole 1121, thereby achieving electrical connection between the first connecting member 11 and the second connecting member 13. The connection between the first connecting member 11 and the second connecting member 13 is simple, thus the electrical connection between the first connecting member 11 and the second connecting member 13 can be achieved quickly, thereby improving the automation efficiency of the production line.

The first positioning portion 1312 is bent at a first angle $\alpha 1$ relative to the first plate 131 in the direction in which the first positioning portion 1312 faces away from the second plate 132, and the first angle $\alpha 1$ is greater than or equal to 45 degrees and less than 80 degrees.

If the first angle $\alpha 1$ at which the first positioning portion 1312 is bent relative to the first plate 131 in the direction in which the first positioning portion 1312 faces away from the second plate 132 is less than 45 degrees, when the first positioning portion 1312 is inserted into the first positioning hole 1121, the first positioning portion 1312 is prone to detach from the first positioning hole 1121, and connection stability between the second connecting member 13 and the first connecting portion 112 is poor. If the first angle $\alpha 1$ at which the first positioning portion 1312 is bent relative to the first plate 131 in the direction in which the first positioning portion 1312 faces away from the second plate 132 is greater than 80 degrees, it is necessary, in view of the electrical conductivity of the second connecting member 13, to avoid scraping or wearing of the second connecting member 13 during mounting or detaching of the second connecting member 13. Thus, the first connecting portion 112 or the second connecting portion 113 is prone to beak during bending of the first connecting portion 112 in the direction away from the second connecting portion 113 or bending of the second connecting portion 113 in the direction away from the first connecting portion 112, adversely affecting the service life of the first connecting member 11. In the disclosure, the first angle $\alpha 1$ at which the first positioning portion 1312 is bent relative to the first plate 131 in the direction away from the second plate 132 is greater than or equal to 45 degrees and less than 80 degrees, it can ensure that the first positioning portion 1312 can be stably inserted into the first positioning hole 1121, thereby ensuring connection stability between the first connecting member 11 and the second connecting member 13, and during mounting or detaching of the second connecting member 13, an excessive bending of the first connecting portion 112 in the direction away from the second connecting portion 113 or an excessive bending of the second connecting portion 113 in the direction away from the first connecting portion 112 can be avoided, ensuring the service life of the first connecting member 11.

Referring to FIG. 4 and FIG. 8, the first connecting portion 112 further defines a first fixing hole 1122 that is located at one side of the first positioning hole 1121 away from the first bending portion 111. The second connecting portion 113 defines a second fixing hole 1131, and the first fixing hole 1122 is opposite to the second fixing hole 1131 in a thickness direction of the first connecting member 11. The connecting structure 100 further includes a fastener 50, the fastener 50 extends through the second fixing hole 1131 and the first fixing hole 1122 in sequence to fix the first connecting portion 112 to the second connecting portion 113, and the second connecting member 13 is located between the first bending portion 111 and the fastener 50 in a height direction of the first connecting member 11.

Both the first fixing hole 1122 and the second fixing hole 1131 are through holes. For example, both the first fixing hole 1122 and the second fixing hole 1131 may be round holes, and a central axis of the first fixing hole 1122 is coaxial with a central axis of the second fixing hole 1131 facing the first fixing hole 1122. The first fixing hole 1122 may be implemented as one first fixing hole 1122, or alternatively, as two or more first fixing holes 1122, where the number of the second fixing holes 1131 is the same as that of the first fixing holes 1122. In the disclosure, the first fixing hole 1122 is implemented as two first fixing holes 1122, the two first fixing holes 1122 are defined at the first connecting portion 112 and spaced apart from each other, and correspondingly, the two second fixing holes 1131 are spaced apart from each other at the second connecting portion 113.

Referring to FIG. 7, the first connecting portion 112 defines the first fixing hole 1122 at one side of the first connecting portion 112 away from the first bending portion 111. Correspondingly, the second connecting portion 113 defines a second fixing hole 1131 at one side away from the first bending portion 111. The first fixing hole 1122 is opposite to the second fixing hole 1131. The fastener 50 extends through the second fixing hole 1131 and the first fixing hole 1122 in sequence and is mounted to the first connecting portion 112 and the second connecting portion 113, thus the first connecting portion 112 and the second connecting portion 113 can stably clamp the second connecting member 13, and the fastener 50 can limit the second connecting member 13 in the inserting groove 114, thereby preventing the second connecting member 13 from detaching from the inserting groove 114, and ensuring the connection reliability between the second connecting member 13 and the first connecting member 11. The fastener 50 may be a bolt or other connecting member.

Referring to FIG. 4 and FIG. 8, the first connecting portion 112 further defines a second positioning hole 1123. The second positioning hole 1123 and the first positioning hole 1121 are respectively located at two opposite ends of the first connecting portion 112 in a height direction of the first connecting portion 112. The first plate 131 further includes a second end 1313. The second end 1313 and the first end 1311 are respectively located at two opposite ends of the first plate 131. The second end 1313 has a second positioning portion 1314 that is bent relative to the first plate 131 in the direction in which the second positioning portion 1314 faces away from the second plate 132. The second positioning portion 1314 is inserted into the second positioning hole 1123.

Correspondingly, the second positioning hole 1123 is a through hole. The second positioning hole 1123 can be implemented as one second positioning hole 1123, or alternatively, two or more second positioning holes 1123, where the number of the second positioning portions 1314 is the same as that of the second positioning holes 1123. In the disclosure, the second positioning hole 1123 is implemented as two positioning holes 1123, and the two second positioning holes 1123 are defined at the second connecting portion 113 and spaced apart from each other. The two second positioning portions 1314 are disposed at the second end 1313 and at two opposite sides of the second end 1313. The two second positioning holes 1123 and two second positioning portions 1314 are provided to ensure that the second connecting member 13 does not tilt after the conducting member 30 is mounted to the second connecting member 13, thereby ensuring the connection stability between the conducting member 30 and the second connecting member 13.

Similarly, in a case where there are multiple second positioning holes 1123, the multiple second positioning holes 1123 are located at the same height of the first connecting portion 112. Correspondingly, the multiple first positioning portions 1312 are located at the same height of the first plate 131, and the multiple first positioning holes 1121 and the multiple second positioning holes 1123 are defined at the first connecting portion 112. During mounting of the second connecting member 13 into the inserting groove 114, the multiple second positioning portions 1314 are simultaneously inserted into the corresponding second positioning holes 1123, and the multiple first positioning portions 1312 are inserted into the corresponding first positioning holes 1121.

Referring to FIG. 6 and FIG. 7, the second positioning portion 1314 is bent relative to the first plate 131 in a direction in which the second positioning portion 1314 faces away from the second plate 132. When the second connecting member 13 is mounted to the inserting groove 114, the second positioning portion 1314 faces the first connecting portion 112 relative to the first plate 131. The second positioning portion 1314 is inserted into the second positioning hole 1123, and the second positioning portion 1314 can abut against a peripheral wall of the second positioning hole 1123. Thus, the second connecting member 13 is limited in the height direction of the second connecting member 13 by the first positioning portion 1312 and the second positioning portion 1314, thereby enhancing the connection stability between the first connecting member 11 and the second connecting member 13.

The second positioning portion 1314 is bent at a second angle α2 relative to the first plate 131 in the direction in which the second positioning portion 1314 faces away from the second plate 132, and the second angle α2 is greater than or equal to 45 degrees and less than 80 degrees.

If the second angle α2 at which the second positioning portion 1314 is bent relative to the first plate 131 in a direction in which the second positioning portion 1314 faces away from the second plate 132 is less than 45 degrees, when the second positioning portion 1314 is inserted into the second positioning hole 1123, the second positioning portion 1314 is prone to detach from the second positioning hole 1123, and the connection stability between the second connecting member 13 and the first connecting portion 112 is poor. If the second angle α2 at which the second positioning portion 1314 is bent relative to the first plate 131 in a direction in which the second positioning portion 1314 faces away from the second plate 132 is greater than 80 degrees, during mounting or detaching of the second connecting member 13, it is necessary, in view of the electrical conductivity of the second connecting member 13, to avoid craping or wearing of the second connecting member 13, and thus the first connecting portion 112 needs to be bent in the direction away from the second connecting portion 113 or the second connecting portion 113 needs to be bent in the direction away from the first second connecting portion 112 so that a distance between the first connecting portion 112 and the second connecting portion 113 can be increased. However, the first connecting portion 112 or the second connecting member 113 is prone to break under an excessive bending, adversely affecting the service life of the first connecting member 11. In the disclosure, the second positioning portion 1314 is bent at the second angle α2 relative to the first plate 131 in the direction in which the second positioning portion 1314 faces away from the second plate 132, and the second angle α2 is greater than or equal to 45 degrees and less than 80 degrees, it can ensure that the second positioning portion 1314 can be stably inserted into the second positioning hole 1123, thereby ensuring the connection stability between the first connecting member 11 and the second connecting member 13. During mounting or detaching of the second connecting member 13, an excessive bending of the first connecting portion 112 in the direction away from the second connecting portion 113 or an excessive bending of the second connecting portion 113 in the direction away from the first connecting portion 112 can be avoided, ensuring the service life of the first connecting member 11.

Alternatively, in a case where the second connecting member 13 is first mounted in the inserting groove 114 and the conducting member 30 is then mounted in the accommodating cavity 133 of the second connecting member 13, the second connecting portion 113 can be properly bent so that the conducting member 30 can be mounted in the accommodating cavity 133. During bending of the second connecting portion 113, it needs to ensure that the first positioning portion 1312 is always not separated from the first positioning hole 1121 and the second positioning portion 1314 is always not separated from the second positioning hole 1123, thereby preventing an inner wall of the second sub-section 1343 of the second connecting member 13 from scratching the conducting member 30.

Alternatively, the conducting member 30 may be first mounted into the accommodating cavity 133 of the second connecting member 13. During mounting of the conducting member 30 into the accommodating cavity 133, the first plate 131 can be bent so that the opening 1331 of the accommodating cavity 133 can be expanded and the second width D2 of the second gap 1333 can be enlarged, thereby preventing the conducting member 30 from scratching the second sub-section 1343 close to the opening 1331. After the conducting member 30 is mounted at the first gap 1332, the first plate 131 can be released so that the first sub-section 1342 of the first plate 131 and the first sub-section 1342 of the second plate 132 can clamp two surfaces of the conducting member 30 in the thickness direction of the conducting member 30, and at this point, the first sub-section 1342 of the first plate 131 is pushed apart from the first sub-section 1342 of the second plate 132, and then a combination of the conducting member 30 and the second connecting member 13 can be mounted in the inserting groove 114.

Referring to FIG. 4 and FIG. 7, as an example, the second connecting portion 113 defines a third positioning hole 1132. The second plate 132 includes a third end 1321 opposite the first end 1311. The third end 1321 and the first end 1311 cooperatively define the opening 1331 of the accommodating cavity 133. The conducting member 30 can be inserted into the accommodating cavity 133 through the opening 1331. The third end 1321 has a third positioning portion 1322. The third positioning portion 1322 is bent relative to the second plate 132 in a direction in which the third positioning portion 1322 faces away from the first plate 131, and the third positioning portion 1322 is inserted in the third positioning hole 1132.

The third positioning hole 1132 is defined at the second connecting portion 113 and opposite to the first positioning hole 1121. During insertion of the second connecting member 13 into the inserting groove 114, the second connecting portion 113 can be bent so that the second connecting member 13 can be vertically inserted into the inserting groove 114. When the second positioning portion 1314 is inserted into the second positioning hole 1123, the first positioning portion 1312 is correspondingly aligned with and inserted into the first positioning hole 1121, and the third positioning portion 1322 is correspondingly aligned with and inserted into the third positioning hole 1132. When the conducting member 30 is inserted into the first gap 1332 and abuts against the first sub-sections 1342 on both sides, the first positioning portion 1312 and the second positioning portion 1314 have a function of limitation to prevent detachment of the second connecting member 13 that occurs due to a force applied to insert the conducting member 30, thereby ensuring the connection stability between the first connecting member 11 and the second connecting member 13. Based on above, the third positioning portion 1322 is provided at the second plate 132, so that the second plate 132 is snapped to the second connecting portion 113 to ensure the relative balance between the first plate 131 and the second plate 132. The third positioning portion 1322 has a function of limitation to prevent tilting of the second plate 132 relative to the first plate 131 that may occur due to the force applied to insert the conducting member 30, thereby enhancing the connection stability between the first connecting member 11 and the second connecting member 13.

Alternatively, the third positioning portion 1322 is bent at a third angle α3 relative to the second plate 132 in a direction in which the third positioning portion 1322 faces away from the first plate 131, the first positioning portion 1312 is bent at the first angle α1 relative to the first plate 131 in the direction in which the first positioning portion 1312 faces away from the second plate 132, and a value range of the third angle α3 is equal to that of the first angle α1. Thus, during mounting or detachment of the second connecting member 13, the second connecting portion 113 or the first connecting portion 112 can be avoided from excessive bending, thereby ensuring the service life of the first connecting member 11.

For example, the first angle α1 of the first positioning portion 1312, the second angle α2 of the second positioning portion 1314, and the third angle α3 of the third positioning portion 1322 can each set to be 45 degrees, so that the first connecting portion 112 can be bent away from the second connecting portion 113 at an appropriately reduced angle, thereby prolonging the service life of the first connecting member 11, and facilitating mounting of the second connecting member 13 to the inserting groove 114 of the first connecting member 11.

In the disclosure, the first positioning portion 1312 and the third positioning portion 1322 are bent, and after the second connecting member 13 is mounted to the first connecting member 11, in the thickness direction of the first connecting member 11, a first gap is defined between the first plate 131 and the first connecting portion 112, a second gap is defined between the second plate 132 and the second connecting portion 113, and the sum of the first gap and the second gap is denoted as S1, where S1 satisfies $0.3*H2 \leq S1 \leq 0.5*H2$. The first gap may be the same as or different from the second gap. The second connecting member 13 is inserted into the inserting groove 114, and the third width D3 of the inserting groove 114 is equal to a sum of the second width D2 of the second gap 1333, the second thickness H2 of the first plate 131, the second thickness H2 of the second plate 132, the first gap, and the second gap. The first connecting portion 112 can press the first positioning portion 1312 towards the third positioning portion 1322, and the second connecting portion 113 can press the third positioning portion 1322 towards the first positioning portion 1312, so that the resilient portion 134 of the second connecting member 13 is in a resiliently compressed state, and the first sub-section 1342 of the first plate 131 and the first sub-section 1342 of the second plate 132 press the two surfaces of the conducting member 30 in the thickness direction. Exemplarily, the second plate 132 further includes a fourth end 1323, the fourth end 1323 and the third end 1321 are respectively located at two opposite ends of the second plate 132, the fourth end 1323 is opposite to the second end 1313, one end of the bridging portion 135 is connected to the fourth end 1323, and the other end of the bridging portion 135 is connected to the second end 1313.

The bridging portion 135 is disposed at one end of the accommodating cavity 133 opposite to the opening 1331. The bridging portion 135 is connected to the first plate 131 and the second plate 132, thus the bridging portion 135 can support one end of the conducting member 30 to limit the conducting member 30 within the accommodating cavity 133. The conducting member 30 remains within the accommodating cavity 133, thereby ensuring the connection reliability between the conducting member 30 and the second connecting member 13.

Referring to FIG. 7, a second thickness H2 of the first plate 131 is equal to a second thickness H2 of the second plate 132. When the second connecting member 13 is in a free state, one end of the first positioning portion 1312 and one end of the third positioning portion 1322 defines a third gap 1334 in the thickness direction of the second connecting member 13, and a fourth width D4 of the third gap 1334 satisfies $D2+6.3*H2 \leq D4 \leq D2+7.5*H2$.

It can be understood that, when the first positioning portion 1312 is inserted into the first positioning hole 1121 and the third positioning portion 1322 is inserted into the third positioning hole 1132, both the first positioning portion 1312 and the third positioning portion 1322 are in a free state. The fourth width D4 of the third gap 1334 is a distance, in the thickness direction of the second connecting member 13, between an endpoint of the one end of the first positioning portion 1312 farthest from the first plate 131 and an endpoint of the one end of the third positioning portion 1322 farthest from the second plate 132. If the fourth width D4 of the third gap 1334 is less than D2+6.3*H2, the fourth width D4 of the third gap 1334 is excessively small, that is, a bending degree of the first positioning portion 1312 and/or a bending degree of the third positioning portion 1322 is excessively small, the first positioning portion 1312 is prone to detach from the first positioning hole 1121, and the third positioning portion 1322 is also prone to detach from the third positioning hole 1132, thereby causing a poor connection reliability of the first connecting member 11 and the second connecting member 13. Consequently, the width of the accommodating cavity 133 will be excessively small, the thickness of the conducting member 30 needs to be reduced, resulting in a poor structural strength of the conducting member 30. If the fourth width D4 of the third gap 1334 is greater than D2+7.5*H2, the bending degree of the first positioning portion 1312 and/or the bending degree of the second positioning portion 1314 is excessively large, and thus a large force is required to bend the second connecting portion 113 during insertion of the first positioning portion 1312 into the first positioning hole 1121 and insertion of the third positioning portion 1322 into the third positioning hole 1132, it may cause an excessive bending of the second connecting portion 113, resulting in a fracture between the second connecting portion 113 and the first bending portion 111. Consequently, the width of the accommodating cavity 133 will be excessively large, resulting in an enlarged space occupied by the connecting structure 100. In the disclosure, in the thickness direction of the second connecting member 13, the fourth width D4 of the third gap 1334 satisfies D2+6.3*H2≤D4≤D2+7.5*H2, the first positioning portion 1312 can be stably snapped in the first positioning hole 1121, and the third positioning portion 1322 can be stably snapped in the third positioning hole 1132, thereby ensuring the connection reliability between the first connecting member 11 and the second connecting member 13. Furthermore, the first positioning portion 1312 is inserted into the first positioning hole 1121 and the third positioning hole 1132 is inserted into the third positioning hole 1132, thus the assembly is convenient and fast, which is beneficial to improving the automation efficiency of the production line. In addition, the width of the accommodating cavity 133 can be effectively prevented from being excessively large, thereby reducing the effect of the space occupied by the whole connecting structure 100 on the volume of the battery module 1000.

In the disclosure, a third thickness H3 of the first connecting portion 112 may be equal to a third thickness H3 of the second connecting portion 113, and thus the third thickness H3 satisfies 2.0*H2≤H3≤2.5*H2. During mounting of the second connecting member 13, the second connecting portion 113 or the first connecting portion 112 needs to be bent, and the third thickness H3 satisfies 2.0*H2≤H3≤2.5*H2, thereby preventing the third thickness H3 of the first connecting portion 112 and the third thickness H3 of the second connecting portion 113 from being excessively large or excessively small and preventing the mounting of the second connecting member 13 from being affected.

Figure 9:
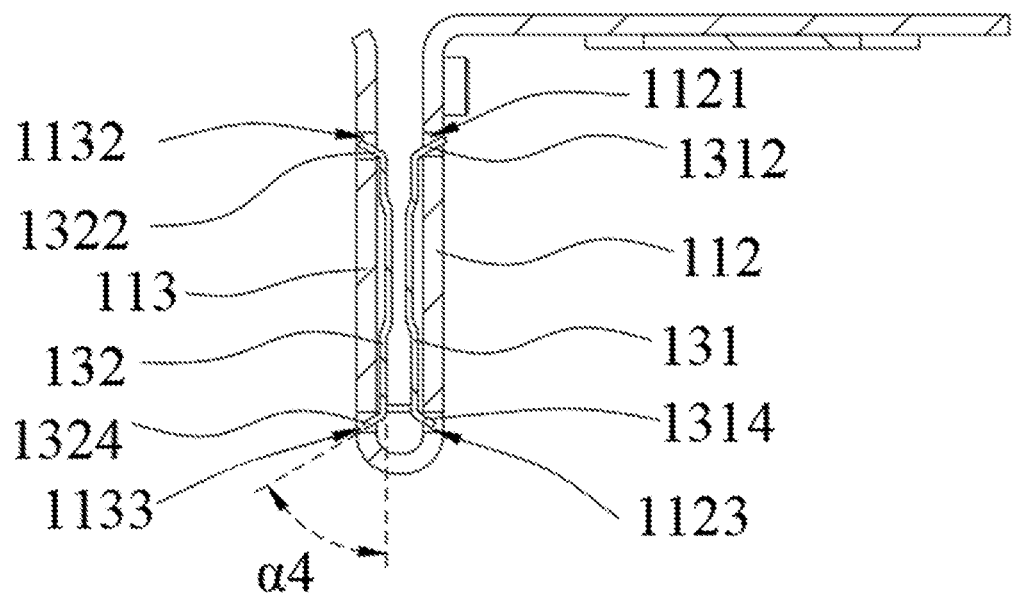
FIG. 9 is a schematic cross-sectional view of another connecting structure provided in an implementation of the disclosure.

Referring to FIG. 9, optionally, the second connecting portion 113 may further define a fourth positioning hole 1133. The fourth positioning hole 1133 is opposite to the second positioning hole 1123 in the thickness direction of the first connecting member 11. The fourth end 1323 of the second plate 132 is further provided with a fourth positioning portion 1324. The fourth positioning portion 1324 is bent relative to the second plate 132 in a direction in which the fourth positioning portion 1324 faces away from the first plate 131. The fourth positioning portion 1324 is inserted into the fourth positioning hole 1133.

Correspondingly, the fourth positioning hole 1133 is a through hole. The fourth positioning hole 1133 may be implemented as one fourth positioning hole 1133, or alternatively, two or more fourth positioning holes 1133. The number of the fourth positioning portions 1324 is the same as the number of the fourth positioning holes 1133. In the disclosure, the fourth positioning hole 1133 is implemented as two fourth positioning holes 1133, the two fourth positioning holes 1133 are defined at the second connecting portion 113 and spaced apart from each other, and the two fourth positioning portions 1324 are respectively arranged at two opposite sides of the fourth end 1323. With the two fourth positioning holes 1133 and the two fourth positioning portions 1324, the connection stability between the second connecting member 13 and the first connecting member 11 can be further enhanced.

Similarly, in a case where the fourth positioning hole 1133 is implemented as multiple fourth positioning holes 1133, the multiple fourth positioning holes 1133 are located at the same height of the second connecting portion 113. Correspondingly, the multiple fourth positioning portions 1324 are located at the same height of the second plate 132. The second connecting portion 113 defines the multiple fourth positioning holes 1133 and multiple third positioning holes 1132. During mounting of the second connecting member 13 into the inserting groove 114, the multiple fourth positioning portions 1324 are simultaneously inserted into the multiple fourth positioning holes 1133, respectively, and the multiple third positioning portions 1322 are inserted into the multiple third positioning holes 1132, respectively.

The fourth positioning portion 1324 is bent relative to the second plate 132 in the direction in which the fourth positioning portion 1324 faces away from the first plate 131. During mounting of the second connecting member 13 into the inserting groove 114, the fourth positioning portion 1324 faces the second connecting portion 113 relative to the second plate 132, the fourth positioning portion 1324 is inserted into the fourth positioning hole 1133 and can abut against a peripheral wall of the fourth positioning hole 1133, and thus the second connecting member 13 is limited in the height direction of the second connecting member 13 by the third positioning portion 1322 and the fourth positioning portion 1324, thereby enhancing the connection stability between the first connecting member 11 and the second connecting member 13.

Alternatively, the fourth positioning portion 1324 is bent at a fourth angle α4 relative to the second plate 132 in a direction in which the fourth positioning portion 1324 faces away from the first plate 131, and a value range of the fourth angle α4 is equal to that of the third angle α3 of the third positioning portion 1322. The fourth angle α4 of the fourth positioning portion 1324 can be equal to the third angle α3 of the third positioning portion 1322, for example, the fourth angle α4 of the fourth positioning portion 1324 can be 45 degrees.

Exemplarily, the first connecting member 11 can further include a welding portion 115, where the welding portion 115 is connected to one end of the first connecting portion 112 away from the first bending portion 111.

The welding portion 115 of the first connecting member 11 may be welded to the battery cell 200 in the battery module 1000, so as to electrically connect the first connecting member 11 to the battery cell 200. The welding portion 115 is welded to the battery cell 200, so that the whole connecting structure 100 can be prevented from detaching from the battery cell 200, and the connection stability between the connecting structure 100 and the battery cell 200 can be ensured. An extending direction of the welding portion 115 may be the same as that of the first connecting portion 112, for example, the welding portion 115 is part of the first connecting portion 112. Alternatively, the extending direction of the welding portion 115 is different from that of the first connecting portion 112, for example, the extending direction of the welding portion 115 is perpendicular to that of the first connecting portion 112.

The first connecting member 11 further includes a second bending portion 116, where the second bending portion 116 is located between the welding portion 115 and the first connecting portion 112, and the welding portion 115 is bent and connected to the first connecting portion 112 via the second bending portion 116.

In the disclosure, the welding portion 115 is connected to the first connecting portion 112 through the second bending portion 116 in a bending manner. As such, the first connecting portion 112 and the second connecting portion 113 may be mounted at a side of the battery module 1000. Generally, an interface of a cooler is mounted at the side of the battery module 1000 and thus protrudes relative to the side of the battery module 1000, the first connecting portion 112 and the second connecting portion 113 can be mounted at the side of the battery module 1000 so that an internal space of the battery module 1000 can be fully utilized.

Referring to FIG. 8, exemplarily, the first connecting member 11 can further include a third bending portion 117, and the third bending portion 117 is connected to one end of the second connecting portion 113 away from the first bending portion 111.

Figure 10:
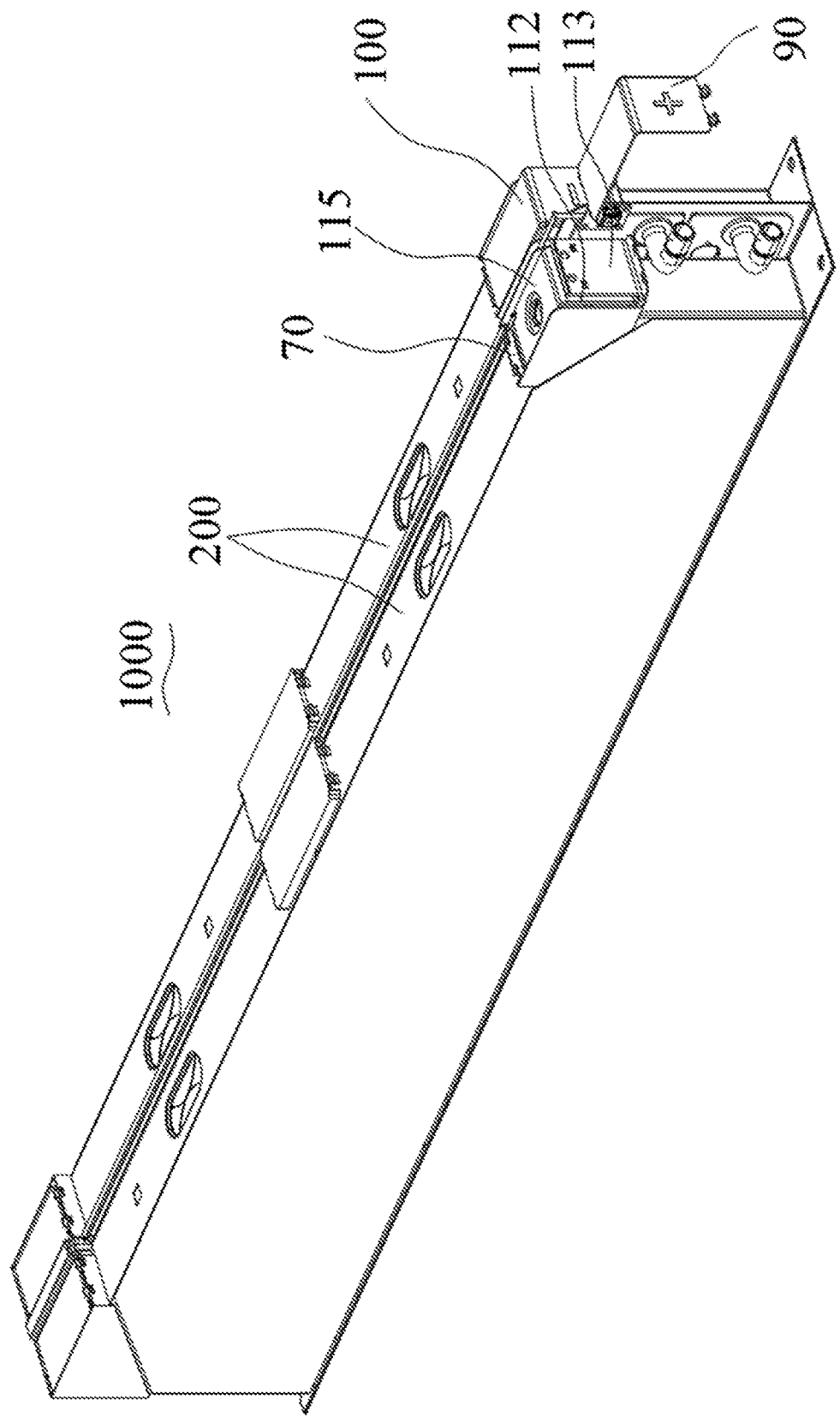
FIG. 10 is a perspective schematic structural view of a battery module provided in an implementation of the disclosure.

Referring to FIG. 10, the connecting assembly 10 includes a base 70 and a cover plate 90. The first connecting member 11 is mounted at the base 70. The cover plate 90 covers the base 70 and shields the connecting assembly 10.

Part of the first connecting member 11 can be mounted at the base 70, the base 70 can have an insulating function, and another part of the first connecting member 11 which is not electrically connected to the battery cell 200 is insulated from the battery cell 200 and is covered between the cover plate 90 and the base 70 via the cover plate 90, so as to protect the connecting assembly 10 in an insulating manner.

The base 70 may be sleeved on one end of the battery cell 200. The base 70 shields one end of the battery cell 200. The base 70 may define a through hole, so that the battery cell 200 can be welded to the welding portion 115 through the through hole. The base 70 is snap-fitted with the cover plate 90 to enable most of the first connecting member 11 and the second connecting member 13 to be shielded between the base 70 and the cover plate 90. The opening 1331 for mounting of the conducting member 30 is reserved between the base 70 and the cover plate 90, so that the conducting member 30 can be electrically connected to two adjacent second connecting members 13.

An energy storage apparatus is provided in the implementations of the disclosure, and the energy storage apparatus includes the battery module 1000 provided in any one of the implementations of the disclosure.

It can be understood that the energy storage apparatus may include, but is not limited to, a battery pack, a battery system, a battery cabinet, a centralized energy storage apparatus, and the like.

An electronic device is further provided in the implementations of the disclosure. The electronic device includes the energy storage apparatus provided in any one of the implementations of the disclosure, and the energy storage apparatus is configured to power the electronic device.

The technical solutions of the implementations of the disclosure are all applicable to various electronic devices using the energy storage apparatus, for example, a battery cart, an electric toy, an electric tool, an electric vehicle, a ship, a spacecraft, a mobile phone, a portable device, a palmtop computer, and a notebook computer.

In the energy storage apparatus and the electronic device of the disclosure, the second connecting member 13 is provided with the resilient portion 134. After the second connecting member 13 is inserted into the inserting groove 114 of the first connecting member 11, the conducting member 30 can be inserted into the first gap 1332 along the resilient portion 134 of the first plate 131 and the resilient portion 134 of the second plate 132 to resiliently abut against the first sub-section 1342 of the first plate 131 and the first sub-section 1342 of the second plate 132, thereby achieving electrically connection between the conducting member 30 and the second connecting member 13. Alternatively, the conducting member 30 is first inserted into the first gap 1332 along the resilient portion 134 of the first plate 131 and the resilient portion 134 of the second plate 132 to resiliently abut against the first sub-section 1342 of the first plate 131 and the first sub-section 1342 of the second plate 132, and then the conducting member 30 and the second connecting member 13 are mounted together into the inserting groove 114 of the first connecting member 11. Since the first width D1 of the first gap 1332 is less than the first thickness H1 of the conducting member 30, the conducting member 30 will apply a pushing force to the first sub-sections 1342 at both sides of the conducting member 30 when the conducting member 30 is inserted into the first gap 1332. Since the first sub-section 1342 is part of the resilient portion 134, the first sub-section 1342 will have a restoring force to press the conducing member 30 when being subject to the pushing force applied by the conducting member 30, so that a surface of the first sub-section 1342 of the first plate 131 facing the first gap 1332 and a surface of the first sub-section 1342 of the second plate 132 facing the first gap 1332 can clamp the conducting member 30. In addition, the bridging portion 135 between the first plate 131 and the second plate 132 supports one end of the conducting member 30, thereby preventing the conducting member 30 from falling off from the first gap 1332, and ensuring stability of electrical connection between the conducting member 30 and the second connecting member 13. In addition, the second connecting member 13 abuts against the first connecting portion 112 and the second connecting portion 113 to achieve electrical connection between the second connecting member 13 and the first connecting member 11, thereby achieving electrical connection among the conducting member 30, the second connecting member 13, and the first connecting member 11. The connecting structure 100 of the disclosure does not require a bolt connection, thereby avoiding overheating and fire caused by a bolt torque attenuation caused by the bolt connection, and ensuring the safety of the battery module 1000. At the same time, quick insertion and connection of the second connecting member 13 facilitates improving automation efficiency of the production line and improving production efficiency.

Some of the implementations of the disclosure are described above. It is noted that, a person of ordinary skill in the art may further make improvements and modifications without departing from the principle of the disclosure, and these improvements and modifications shall also fall within the scope of protection of the disclosure.

What is claimed is:

1. A connecting structure applicable to a battery module comprising at least two battery cells, wherein the connecting structure comprises:

connecting assemblies, wherein each of the connecting assemblies comprises a first connecting member and a second connecting member, wherein the first connecting member comprises a first bending portion, a first connecting portion, and a second connecting portion opposite the first connecting portion, one end of the first connecting portion is connected to one end of the second connecting portion via the first bending portion, and the first connecting portion, the first bending portion, and the second connecting portion surround a space to define an inserting groove; the second connecting member is mounted in the inserting groove and resiliently abuts against the first connecting portion and the second connecting portion; the second connecting member comprises a bridging portion, a first plate, and a second plate opposite the first plate, two ends of the bridging portion are respectively connected to the first plate and the second plate, and the bridging portion, the first plate, and the second plate surround a space to define an accommodating cavity; each of the first plate and the second plate is provided with a resilient portion, the resilient portion has a first sub-section protruding towards the accommodating cavity, and the first sub-section of the first plate and the first sub-section of the second plate cooperatively define a first gap extending in a thickness direction of the second connecting member; the first connecting portion defines a first positioning hole, the first plate comprises a first end, the first end has a first positioning portion, the first positioning portion is bent relative to the first plate in a direction in which the first positioning portion faces away from the second plate, and the first positioning portion is inserted into the first positioning hole; the first positioning portion is bent at a first angle relative to the first plate in the direction in which the first positioning portion faces away from the second plate, and the first angle is greater than or equal to 45 degrees and less than 80 degrees; the second connecting portion defines a third positioning hole that is opposite to the first positioning hole in a thickness direction of the first connecting member, the second plate comprises a third end opposite the first end, and the third end and the first end cooperatively define the opening of the accommodating cavity, wherein the third end has a third positioning portion, and the third positioning portion is bent relative to the second plate in a direction in which the third positioning portion faces away from the accommodating cavity, and the third positioning portion is inserted into the third positioning hole; and each first connecting portion is electrically connected to one of the at least two battery cells; and a conducting member mounted in the accommodating cavities of two adjacent second connecting members, wherein one end of the conducting member in a height direction of the conducting member abuts against the bridging portion, a first width D1 of the first gap is less than a first thickness H1 of the conducting member, and two opposite sides of the conducting member in a thickness direction of the conducting member resiliently abut against the first sub-section of the first plate and the first sub-section of the second plate, respectively; and the conducting member has a protrusion portion and two insertion portions, wherein the protrusion portion is between and protrudes relative to the two insertion portions, the two insertion portions are mounted in the accommodating cavities of the two adjacent second connecting members, respectively, the conductive member is mounted in the accommodating cavities, the protrusion portion is disposed between two adjacent first connecting members and protrudes in a direction away from the first connecting portion;

wherein the resilient portion further has a second sub-section that is recessed relative to the first sub-section in a direction in which the second sub-section faces away from the accommodating cavity, the accommodating cavity has an opening, and the second sub-section is located between the first sub-section and the opening in a height direction of the second connecting member; the second sub-section of the first plate and the second sub-section of the second plate cooperatively define a second gap in the thickness direction of the second connecting member, a second width D2 of the second gap satisfies 1.3*D1≤D2≤1.5*D1, and the second width D2 of the second gap is greater than the first width D1 of the first gap; a second thickness H2 of the first plate is equal to a second thickness H2 of the second plate, and a third width D3 of the inserting groove satisfies D2+2.3*H2≤D3≤D2+2.5*H2 in a thickness direction of the first connecting member; a third thickness H3 of the first connecting portion is equal to a third thickness H3 of the second connecting portion, and the third thickness H3 satisfies 2.0*H2≤H3≤2.5*H2; the first connecting portion further defines a first fixing hole that is located at one side of the first positioning hole away from the first bending portion, the second connecting portion defines a second fixing hole, and the first fixing hole is opposite to the second fixing hole in a thickness direction of the first connecting member; and the connecting structure further comprises a fastener, the fastener extends through the second fixing hole and the first fixing hole in sequence to secure the first connecting portion to the second connecting portion, and the second connecting member is located between the first bending portion and the fastener in a height direction of the first connecting member.

2. The connecting structure of claim 1, wherein the first connecting portion further defines a second positioning hole, and the second positioning hole and the first positioning hole are respectively located at two opposite ends of the first connecting portion in a height direction of the first connecting portion; the first plate further comprises a second end, the second end and the first end are respectively located at two opposite ends of the first plate, the second end has a second positioning portion that is bent relative to the first plate in the direction in which the second positioning portion faces away from the second plate, and the second positioning portion is inserted into the second positioning hole.

3. The connecting structure of claim 2, wherein the second positioning portion is bent at a second angle relative to the first plate in the direction in which the second positioning portion faces away from the second plate, and the second angle is greater than or equal to 45 degrees and less than 80 degrees.

4. The connecting structure of claim 2, wherein the second plate further has a fourth end, the fourth end and the third end are respectively located at two opposite ends of the second plate, the fourth end is opposite to the second end, one end of the bridging portion is connected to the fourth end, and the other end of the bridging portion is connected to the second end.

5. The connecting structure of claim 1, wherein a second thickness H2 of the first plate is equal to a second thickness H2 of the second plate; when the second connecting portion is in a free state, one end of the first positioning portion and one end of the third positioning portion cooperatively define a third gap in a thickness direction of the second connecting portion, and a fourth width D4 of the third gap satisfies $D2+6.3*H2 \leq D4 \leq D2+7.5*H2$.

6. The connecting structure of claim 1, wherein the first connecting member further comprises a welding portion, wherein the welding portion is connected to one end of the first connecting portion away from the first bending portion.

7. The connecting structure of claim 6, wherein the first connecting member further comprises a second bending portion, the second bending portion is located between the welding portion and the first connecting portion, and the welding portion is bent and connected to the first connecting portion via the second bending portion.

8. The connecting structure of claim 1, wherein the connecting assembly comprises a base and a cover plate, the first connecting member is mounted at the base, and the cover plate covers the base and shields the connecting assembly.

9. A battery module, comprising:
   at least two battery cells; and
   a connecting structure comprising:
      connecting assemblies, wherein each of the connecting assemblies comprises a first connecting member and a second connecting member, wherein the first connecting member comprises a first bending portion, a first connecting portion, and a second connecting portion opposite the first connecting portion, one end of the first connecting portion is connected to one end of the second connecting portion via the first bending portion, and the first connecting portion, the first bending portion, and the second connecting portion surround a space to define an inserting groove; the second connecting member is mounted in the inserting groove and resiliently abuts against the first connecting portion and the second connecting portion; the second connecting member comprises a bridging portion, a first plate, and a second plate opposite the first plate, two ends of the bridging portion are respectively connected to the first plate and the second plate, and the bridging portion, the first plate, and the second plate surround a space to define an accommodating cavity; each of the first plate and the second plate is provided with a resilient portion, the resilient portion has a first sub-section protruding towards the accommodating cavity, and the first sub-section of the first plate and the first sub-section of the second plate cooperatively define a first gap extending in a thickness direction of the second connecting member; the first connecting portion defines a first positioning hole, the first plate comprises a first end, the first end has a first positioning portion, the first positioning portion is bent relative to the first plate in a direction in which the first positioning portion faces away from the second plate, and the first positioning portion is inserted into the first positioning hole; the first positioning portion is bent at a first angle relative to the first plate in the direction in which the first positioning portion faces away from the second plate, and the first angle is greater than or equal to 45 degrees and less than 80 degrees; the second connecting portion defines a third positioning hole that is opposite to the first positioning hole in a thickness direction of the first connecting member, the second plate comprises a third end opposite the first end, and the third end and the first end cooperatively define the opening of the accommodating cavity, wherein the third end has a third positioning portion, and the third positioning portion is bent relative to the second plate in a direction in which the third positioning portion faces away from the accommodating cavity, and the third positioning portion is inserted into the third positioning hole; and each first connecting portion is electrically connected to one of the at least two battery cells; and
      a conducting member mounted in the accommodating cavities of two adjacent second connecting members, wherein one end of the conducting member in a height direction of the conducting member abuts against the bridging portion, a first width D1 of the first gap is less than a first thickness H1 of the conducting member, and two opposite sides of the conducting member in a thickness direction of the conducting member resiliently abut against the first sub-section of the first plate and the first sub-section of the second plate, respectively; and the conducting member has a protrusion portion and two insertion portions, wherein the protrusion portion is between and protrudes relative to the two insertion portions, the two insertion portions are mounted in the accommodating cavities of the two adjacent second connecting members, respectively, the conductive member is mounted in the accommodating cavities, the protrusion portion is disposed between two adjacent first connecting members and protrudes in a direction away from the first connecting portion;
   wherein the resilient portion further has a second sub-section that is recessed relative to the first sub-section in a direction in which the second sub-section faces away from the accommodating cavity, the accommodating cavity has an opening, and the second sub-section is located between the first sub-section and the opening in a height direction of the second connecting member; the second sub-section of the first plate and the second sub-section of the second plate cooperatively define a second gap in the thickness direction of the second connecting member, a second width D2 of the second gap satisfies $1.3*D1 \leq D2 \leq 1.5*D1$, and the second width D2 of the second gap is greater than the first width D1 of the first gap; a second thickness H2 of the first plate is equal to a second thickness H2 of the second plate, and a third width D3 of the inserting groove satisfies $D2+2.3*H2 \leq D3 \leq D2+2.5*H2$ in a thickness direction of the first connecting member; a third thickness H3 of the first connecting portion is equal to a third thickness H3 of the second connecting portion, and the third thickness H3 satisfies $2.0*H2 \leq H3 \leq 2.5*H2$; the first connecting portion further defines a first fixing hole that is located at one side of the first positioning hole away from the first bending portion, the second connecting portion defines a second fixing hole, and the first fixing hole is opposite to the second fixing hole in a thickness direction of the first connecting member; and the connecting structure further comprises a fastener, the fastener extends through the second fixing hole and the first fixing hole in sequence to secure the first connecting portion to the second connecting portion, and the second connecting member is located between the first bending portion and the fastener in a height direction of the first connecting member; and
      wherein the conducting member is electrically connected to the two adjacent second connecting members.

10. The battery module of claim 9, wherein the first connecting portion further defines a second positioning hole, and the second positioning hole and the first positioning hole are respectively located at two opposite ends of the first connecting portion in a height direction of the first connecting portion; the first plate further comprises a second end, the second end and the first end are respectively located at two opposite ends of the first plate, the second end has a second positioning portion that is bent relative to the first plate in the direction in which the second positioning portion faces away from the second plate, and the second positioning portion is inserted into the second positioning hole.

11. The battery module of claim 10, wherein the second positioning portion is bent at a second angle relative to the first plate in the direction in which the second positioning portion faces away from the second plate, and the second angle is greater than or equal to 45 degrees and less than 80 degrees.

12. The battery module of claim 10, wherein the second plate further has a fourth end, the fourth end and the third end are respectively located at two opposite ends of the second plate, the fourth end is opposite to the second end, one end of the bridging portion is connected to the fourth end, and the other end of the bridging portion is connected to the second end.

13. The battery module of claim 9, wherein a second thickness H2 of the first plate is equal to a second thickness H2 of the second plate; when the second connecting portion is in a free state, one end of the first positioning portion and one end of the third positioning portion cooperatively define a third gap in a thickness direction of the second connecting portion, and a fourth width D4 of the third gap satisfies $D2+6.3*H2 \leq D4 \leq D2+7.5*H2$.

14. The battery module of claim 9, wherein the first connecting member further comprises a welding portion, wherein the welding portion is connected to one end of the first connecting portion away from the first bending portion.

15. The battery module of claim 14, wherein the first connecting member further comprises a second bending portion, the second bending portion is located between the welding portion and the first connecting portion, and the welding portion is bent and connected to the first connecting portion via the second bending portion.

16. The battery module of claim 9, wherein the connecting assembly comprises a base and a cover plate, the first connecting member is mounted at the base, and the cover plate covers the base and shields the connecting assembly.

17. An electronic device, comprising a battery module configured to supply the electronic device, the battery module comprising at least two battery cells and a connecting structure, wherein:
the connecting structure comprises:
connecting assemblies, wherein each of the connecting assemblies comprises a first connecting member and a second connecting member, wherein the first connecting member comprises a first bending portion, a first connecting portion, and a second connecting portion opposite the first connecting portion, one end of the first connecting portion is connected to one end of the second connecting portion via the first bending portion, and the first connecting portion, the first bending portion, and the second connecting portion surround a space to define an inserting groove; the second connecting member is mounted in the inserting groove and resiliently abuts against the first connecting portion and the second connecting portion; the second connecting member comprises a bridging portion, a first plate, and a second plate opposite the first plate, two ends of the bridging portion are respectively connected to the first plate and the second plate, and the bridging portion, the first plate, and the second plate surround a space to define an accommodating cavity; each of the first plate and the second plate is provided with a resilient portion, the resilient portion has a first sub-section protruding towards the accommodating cavity, and the first sub-section of the first plate and the first sub-section of the second plate cooperatively define a first gap extending in a thickness direction of the second connecting member; the first connecting portion defines a first positioning hole, the first plate comprises a first end, the first end has a first positioning portion, the first positioning portion is bent relative to the first plate in a direction in which the first positioning portion faces away from the second plate, and the first positioning portion is inserted into the first positioning hole; the first positioning portion is bent at a first angle relative to the first plate in the direction in which the first positioning portion faces away from the second plate, and the first angle is greater than or equal to 45 degrees and less than 80 degrees; the second connecting portion defines a third positioning hole that is opposite to the first positioning hole in a thickness direction of the first connecting member, the second plate comprises a third end opposite the first end, and the third end and the first end cooperatively define the opening of the accommodating cavity, wherein the third end has a third positioning portion, and the third positioning portion is bent relative to the second plate in a direction in which the third positioning portion faces away from the accommodating cavity, and the third positioning portion is inserted into the third positioning hole; and each first connecting portion is electrically connected to one of the at least two battery cells; and
a conducting member mounted in the accommodating cavities of two adjacent second connecting members, wherein one end of the conducting member in a height direction of the conducting member abuts against the bridging portion, a first width D1 of the first gap is less than a first thickness H1 of the conducting member, and two opposite sides of the conducting member in a thickness direction of the conducting member resiliently abut against the first sub-section of the first plate and the first sub-section of the second plate, respectively; and the conducting member has a protrusion portion and two insertion portions, wherein the protrusion portion is between and protrudes relative to the two insertion portions, the two insertion portions are mounted in the accommodating cavities of the two adjacent second connecting members, respectively, the conductive member is mounted in the accommodating cavities, the protrusion portion is disposed between two adjacent first connecting members and protrudes in a direction away from the first connecting portion;
wherein the resilient portion further has a second sub-section that is recessed relative to the first sub-section in a direction in which the second sub-section faces away from the accommodating cavity, the accommodating cavity has an opening, and the second sub-section is located between the first sub-section and the opening in a height direction of the second connecting member; the second sub-section of the first plate and the second sub-section of the second plate cooperatively define a second gap in the thickness direction of the second connecting member, a second width D2 of the second gap satisfies $1.3*D1 \leq D2 \leq 1.5*D1$, and the second width D2 of the second gap is greater than the first width D1 of the first gap; a second thickness H2 of the first plate is equal to a second thickness H2 of the second plate, and a third width D3 of the inserting groove satisfies $D2+2.3*H2 \leq D3 \leq D2+2.5*H2$ in a thickness direction of the first connecting member; a third thickness H3 of the first connecting portion is equal to a third thickness H3 of the second connecting portion, and the third thickness H3 satisfies $2.0*H2 \leq H3 \leq 2.5*H2$; the first connecting portion further defines a first fixing hole that is located at one side of the first positioning hole away from the first bending portion, the second connecting portion defines a second fixing hole, and the first fixing hole is opposite to the second fixing hole in a thickness direction of the first connecting member; and the connecting structure further comprises a fastener, the fastener extends through the second fixing hole and the first fixing hole in sequence to secure the first connecting portion to the second connecting portion, and the second connecting member is located between the first bending portion and the fastener in a height direction of the first connecting member; and wherein the conducting member is electrically connected to the two adjacent second connecting members.

18. The electronic device of claim 17, wherein the first connecting portion further defines a second positioning hole, and the second positioning hole and the first positioning hole are respectively located at two opposite ends of the first connecting portion in a height direction of the first connecting portion; the first plate further comprises a second end, the second end and the first end are respectively located at two opposite ends of the first plate, the second end has a second positioning portion that is bent relative to the first plate in the direction in which the second positioning portion faces away from the second plate, and the second positioning portion is inserted into the second positioning hole.

19. The electronic device of claim 18, wherein the second positioning portion is bent at a second angle relative to the first plate in the direction in which the second positioning portion faces away from the second plate, and the second angle is greater than or equal to 45 degrees and less than 80 degrees.

20. The electronic device of claim 18, wherein the second plate further has a fourth end, the fourth end and the third end are respectively located at two opposite ends of the second plate, the fourth end is opposite to the second end, one end of the bridging portion is connected to the fourth end, and the other end of the bridging portion is connected to the second end.

* * * * *